United States Patent [19]
Kaneko et al.

[11] Patent Number: 5,345,053
[45] Date of Patent: Sep. 6, 1994

[54] METHOD AND APPARATUS FOR SUPPLYING POWER FOR ELECTRIC DISCHARGE MACHINING

[75] Inventors: Yuji Kaneko, Sakai; Shinji Ito; Toru Saito, both of Kaga, all of Japan

[73] Assignee: Sodick Co., Ltd., Yokohama, Japan

[21] Appl. No.: 111,491

[22] Filed: Aug. 25, 1993

[30] Foreign Application Priority Data

Aug. 25, 1992 [JP] Japan .................... 4-267776

[51] Int. Cl.⁵ ............................ B23H 1/02
[52] U.S. Cl. ............................ 219/69.18
[58] Field of Search ............... 219/69.13, 69.17, 69.18

[56] References Cited

U.S. PATENT DOCUMENTS

| | | | |
|---|---|---|---|
| 4,347,425 | 8/1982 | Obara | 219/69.13 |
| 4,678,884 | 7/1987 | Obara et al. | 219/69.18 |
| 4,720,616 | 1/1988 | Inoue | 219/69.18 |
| 5,064,984 | 11/1991 | Yamamoto et al. | 219/69.13 |

FOREIGN PATENT DOCUMENTS

| | | | |
|---|---|---|---|
| 507560 | 10/1992 | European Pat. Off. | 219/69.13 |
| 63-17569 | 4/1988 | Japan . | |
| 1-295715 | 11/1989 | Japan . | |
| 1-295716 | 11/1989 | Japan . | |
| 3-136719 | 6/1991 | Japan | 219/69.13 |
| 3-196916 | 8/1991 | Japan | 219/69.18 |
| 3-294116 | 12/1991 | Japan . | |
| 9203246 | 3/1992 | PCT Int'l Appl. | 219/69.18 |

Primary Examiner—Geoffrey S. Evans
Attorney, Agent, or Firm—Marks & Murase

[57] ABSTRACT

A method of and apparatus for supplying power during EDMing in which reverse polarity pulses are used to inhibit electrolytic activity. A main voltage pulse of a certain polarity and an auxiliary voltage pulse, preceding the main voltage pulse of the same or reverse polarity, are applied across a machining gap during the on time of a main gate signal and until a discharge is detected. The ratio of the number of auxiliary voltage pulses of regular polarity to those of reverse polarity is set to a desired value depending upon machining conditions, to thereby obtain a good compromise between the conflicting requirements of achieving a high machining rate, while inhibiting undesirable electrolytic activity.

23 Claims, 5 Drawing Sheets

METHOD AND APPARATUS FOR SUPPLYING POWER FOR ELECTRIC DISCHARGE MACHINING

FIELD OF THE INVENTION

The present invention relates to a method for electric discharge machining ("EDMing") and an EDM power supply. More specifically, the present invention relates to a method and apparatus for supplying power to an electroerosion machine using a water-based dielectric fluid.

BACKGROUND OF THE INVENTION

In EDM's, including both wire-cut EDM's and die-sinking EDM's, various problems may arise due to the electrolytic phenomenon associated with the dielectric fluid used.

For example, when applying voltage pulses of a so-called regular polarity across a machining gap of a die-sinking EDM, i.e., wherein the machining electrode is negative and a workpiece is positive, for machining workpieces made of hard alloys, such as tungsten carbide, deionization of the dielectric in the machining gap may become difficult as machining proceeds. Particularly in portion(s) of the machining gap, such as near the center of the bottom of the machining electrode, where it is difficult to carry away the machined particles, the resistivity of the dielectric fluid may locally decrease.

In addition, when using water-based dielectric fluids which include a high polymer in a die-sinking EDM, there is a tendency to produce tar in the machining gap. Since the tar has a greater electrical conductivity than the dielectric, the resistivity of the gap may locally decrease. When electrolytic or arc currents flow through such low-resistivity portions of the gap, an oxide adherent may be quickly produced. The insulating property of this oxide adherent causes the machining rate to dramatically decrease and adversely affects the quality of the machined surface.

When using a kerosene-based dielectric fluid in a die-sinking EDM, there also is the tendency to produce tar in the machining gap, which may result in arcing. Such arcing may cause cracks on the surface of the workpiece, which will tend to shorten the useful life of die or mold being produced.

When machining a workpiece using a wire-cut EDM, in which water or a water-based dielectric fluid is used, when repeatedly applying voltage pulses across a regularly poled machining gap, i.e., one in which the machining electrode is negative and the workpiece is positive, the dielectric fluid may become electrolyzed, resulting in an electrolytic current flowing across the low-resistivity portion(s) of the gap; which in turn results in the formation of an affected layer on the workpiece surface. Particularly when machining a workpiece made of a hard alloy, such as tungsten carbide, substances susceptible to electrolysis, such as cobalt, may dissolve out of the workpiece resulting in the formation of an affected layer on the workpiece surface, which in turn may damage the workpiece and shorten the life of any die or mold being produced.

In Japanese Patent Publication No. 63-17569, a power supply for a wire-cut EDM is disclosed which has a main power source for generating a discharge across the machining gap with the machining electrode being negatively poled and the workpiece being positively poled, i.e., of regular polarity, and an auxiliary power source for generating a discharge across the gap with the machining electrode being positively poled and the workpiece being negatively poled, i.e., of reverse polarity. In this device, a voltage is first applied in reverse polarity from the auxiliary power source to initialize a discharge. After detecting the occurrence of a discharge, the main power source maintains the discharge in regular polarity while interrupting the power from the auxiliary power source. As a result, the undesirable effects of electrolytic activity are decreased, although at the cost of a reduced machining rate, since the current flow across the gap reverses direction.

SUMMARY OF THE INVENTION

An object of the present invention is to provide a method and power source for electric discharge machining in which electrolytic activity is substantially inhibited without sacrificing machining rate.

It is another object of the present invention to provide a method and power supply for electric discharge machining in which the conflicting requirements of a high machining rate and an inhibition of an electrolytic activity are effectively balanced.

It is further an object of the present invention to provide a method and a power supply for electric discharge machining in which the optimal electric discharge machining corresponding to the physical properties of the workpiece can be realized.

Additional objects and advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

A general aspect of the present invention is the provision of a method for performing electric discharge machining on a workpiece by repeatedly applying main voltage pulses across a machining gap formed between a machining electrode and the workpiece, the voltage pulses being of a regular polarity with the machining electrode being negatively poled and the workpiece being positively poled, and wherein an auxiliary voltage pulse is applied to the machining gap prior to the main voltage pulse and in reverse polarity thereto, so that the machining electrode is positively poled and the workpiece is negatively poled, and in a predetermined ratio with respect to the application of the main voltage pulses.

Another general aspect of the invention is the provision of an EDM power supply for supplying electric power pulses to a machining gap formed between a machining electrode and a workpiece and comprising a first circuit for repeatedly applying a main voltage pulse across the machining gap with the machining electrode being negative with respect to the workpiece, a second circuit for applying a reverse-polarity auxiliary voltage pulse across the machining gap with the machining electrode being positive with respect to the workpiece, and a control circuit connected to the first and second circuits for controlling the reverse-polarity auxiliary voltage pulses so that the reverse-polarity auxiliary voltage pulses are applied across the machining gap at a predetermined ratio with respect to the main voltage pulses during a discharge waiting period and preferably only until the start of a discharge is detected.

BRIEF DESCRIPTION OF THE DRAWINGS

The present invention will be apparent from the following detailed description, when taken in conjunction with the accompanying drawings, in which.

DETAILED DESCRIPTION OF THE PREFERRED EMBODIMENTS

An embodiment of the invention is described hereinafter in detail with reference to the drawings.

Figure 1:
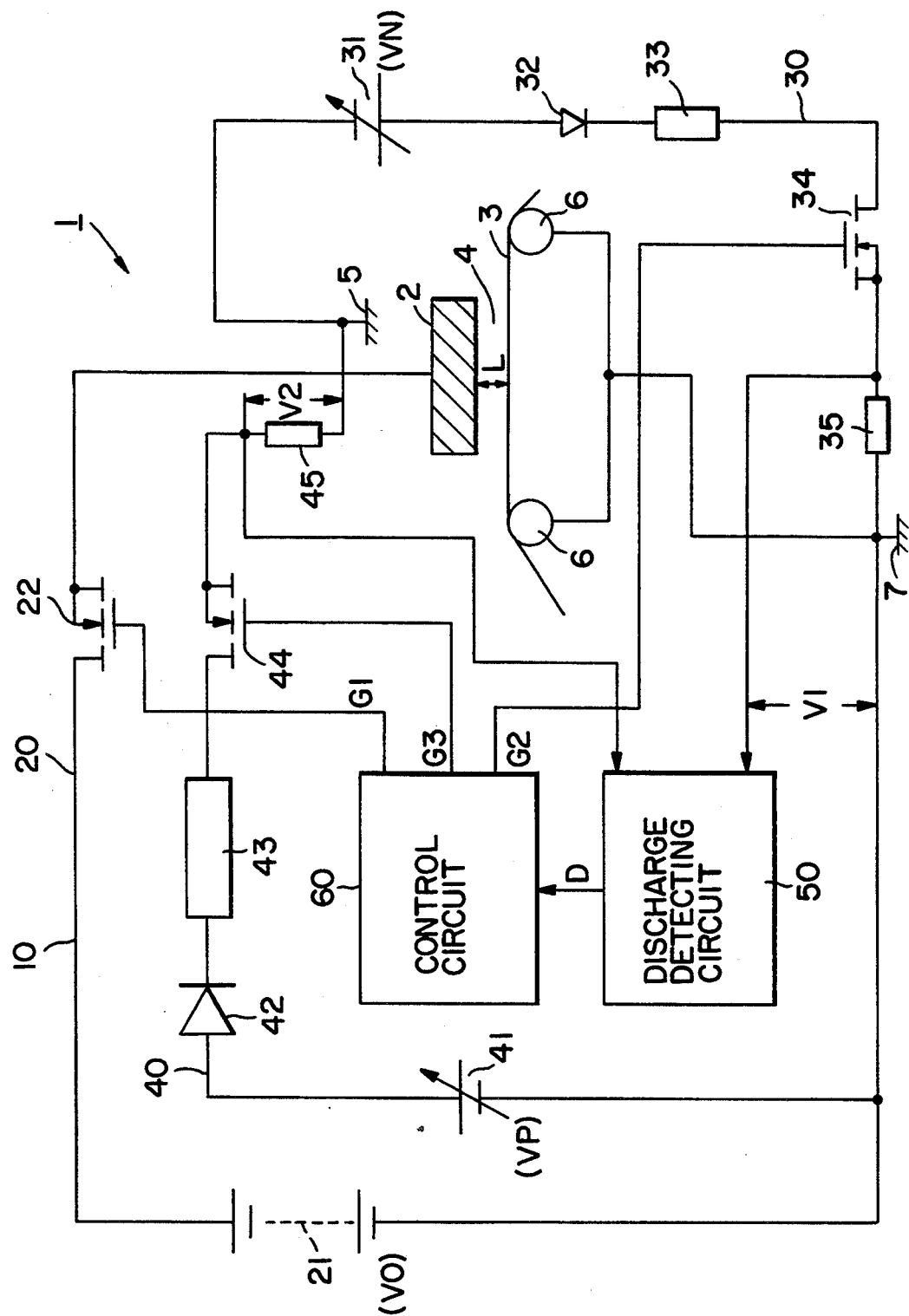
FIG. 1 is a block diagram illustrating an embodiment of the invention as used in a wire-cut electroerosion apparatus.

FIG. 1 shows a wire-cut electroerosion apparatus 1 including an EDM power supply unit 10 for electric discharge machining. Electric energy for machining is supplied from the EDM power supply unit 10, as described below, and is applied to a machining gap 4 formed between a workpiece to be machined 2 and a wire electrode 3. The workpiece 2 is connected to a first ground 5 and the wire electrode 3 is connected to a second ground 7 through a pair of current pickups 6.

The mechanism for running the wire electrode 3 along its predetermined path, the mechanism for providing a relative movement between the wire electrode 2 and the workpiece 3 in accordance with a desired contour to be cut, and a servo-control system for maintaining the proper size L of the machining gap 4 during machining, are all well known and, in the interest of clarity and simplicity, these conventional arrangements have been omitted from FIG. 1.

The EDM power supply unit 10 includes a first circuit 20 for supplying main voltage pulses to the gap 4 with the workpiece 2 being positively poled and the wire electrode 3 being negatively poled; a second circuit 30 for supplying first auxiliary voltage pulses to the gap 4 with the workpiece 2 being negatively poled and the wire electrode 3 being positively poled; and a third circuit 40 for supplying second auxiliary voltage pulses to the gap 4 with the workpiece 2 being positively poled and the wire electrode 3 being negatively poled.

In the illustrated embodiment, the first circuit 20 includes an approximately 250-V high-voltage, direct current power source 21 connected to the second ground 7 at its negative terminal, and a first switching transistor 22 provided between the positive terminal of the high-voltage, d.c. power source 21 and the workpiece 2. The second circuit 30 includes a variable, low-voltage, direct current power source 31, adjustable between approximately 60 volts and 120 volts, which is connected to the workpiece 2 at its negative terminal.

The second circuit 30 further includes a diode 32 for reverse-current protection, a current limiting resistor 33, a second switching transistor 34 and a first discharge detecting resistor 35, all of which are connected in series between the positive terminal of the variable, low-voltage, d.c. power source 31 and the second ground 7.

The third circuit 40 includes a variable, low-voltage, direct current power source 41 adjustable between approximately 60 volts and 120 volts, which is connected to the second ground 7 at its negative terminal. The third circuit 40 further includes a diode 42 for reverse-current protection, a current limiting resistor 43, a third switching transistor 44, and a second discharge detecting resistor 45, all of which are connected in series between the positive terminal of the variable, low-voltage, d.c. power source 41 and the workpiece 2.

The detected voltages V1 and V2 across the ends of the first and second discharge detecting resistors 35 and 45 are input to a discharge detecting circuit 50 which, based on the levels of the detected voltages V1 and V2, detects whether a discharge has taken place in the machining gap.

Figure 2:
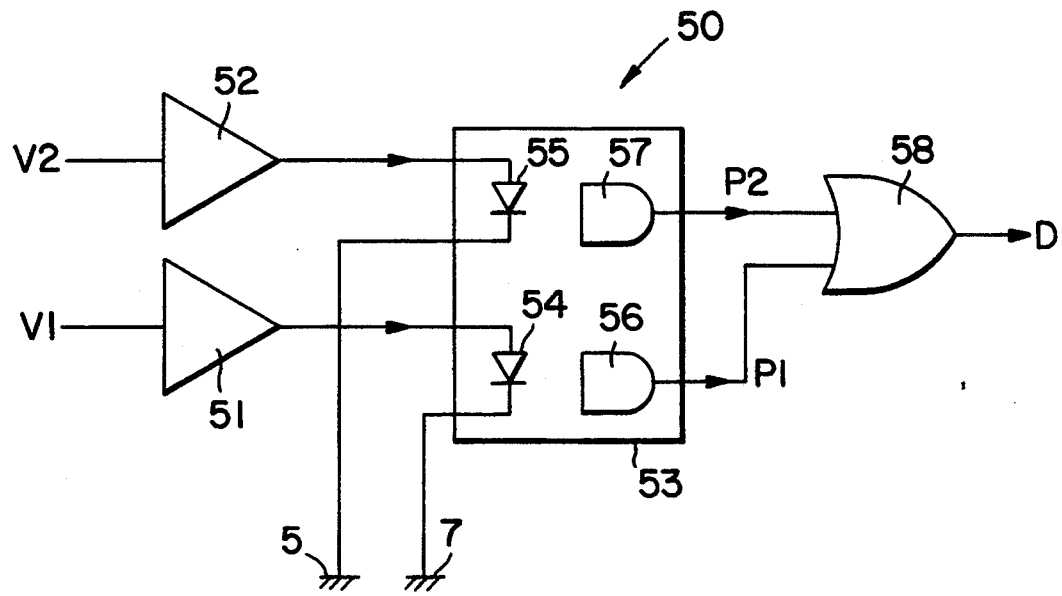
FIG. 2 is a schematic circuit diagram of the discharge detecting circuit of FIG. 1.

FIG. 2 is a schematic circuit diagram of an example of the discharge detecting circuit 50. In the embodiment shown, the discharge detecting circuit 50 includes amplifiers 51 and 52 for amplifying the detected voltages V1 and V2, respectively. The output of the amplifier 51 is supplied to the anode of an LED 54, positioned within a photo coupler 53, the cathode thereof being connected to the second ground 7. The output of the amplifier 52 is supplied to the anode of an LED 55, positioned within the photo coupler 53, the cathode thereof being connected to the first ground 5. The outputs P1 and P2 of the photo sensors 56 and 57, which go high responsive to outputs from the LED's 54 and 55, respectively, are input to an OR gate 58. The OR gate 58 produces a discharge detection signal D when either of the outputs P1 or P2 go high.

Referring back to FIG. 1, the discharge detecting signal D from the discharge detecting circuit 50 is provided to a control circuit 60 for on-off control of the first, second and third switching transistors 22, 34 and 44.

Figure 3:
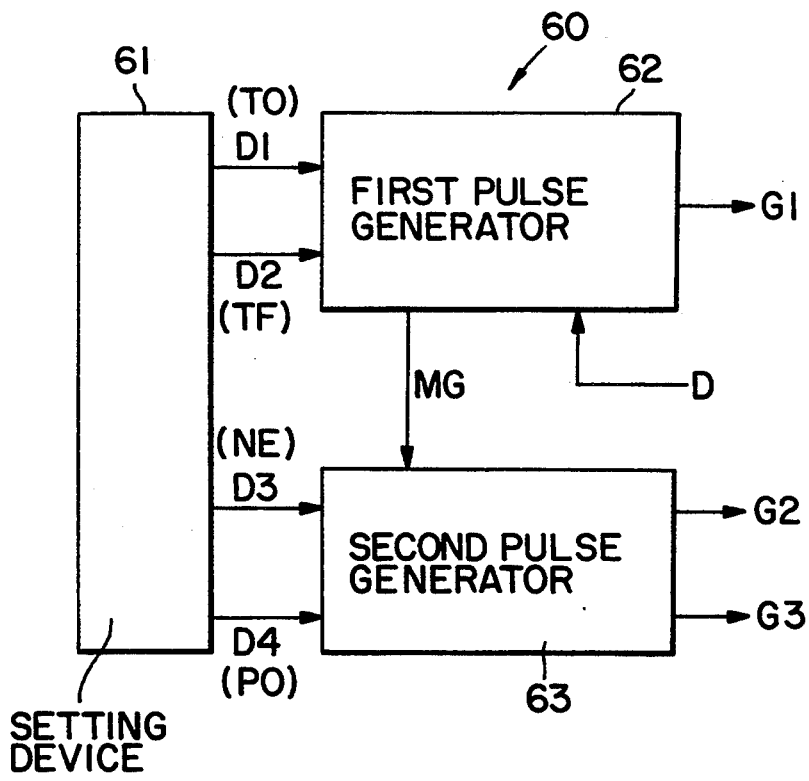
FIG. 3 is a block diagram of the control circuit of FIG. 1.

FIG. 3 is a detailed block diagram showing an example of the control circuit 60. In the embodiment shown, the control circuit 60 comprises a setting device 61, a first pulse generator 62 and a second pulse generator 63. The setting device 61 includes the functions of setting and outputting a first setting data D1, representative of ON-time TO, which corresponds to the time during which machining pulses are applied to the machining gap 4, and a second setting data D2, representative of the off-time TF, which corresponds to the time during which no machining pulses are applied to the machining gap 4. The setting device 61 further includes the function of setting and outputting a third setting data D3 and a fourth setting data D4 which respectively define the number NE, indicative of the number of reverse-polarity auxiliary voltage pulses to be generated in one cycle, and the number PO, indicative of the number of regular-polarity auxiliary voltage pulses to be generated in one cycle.

The first and second setting data D1 and D2 are provided to the first pulse generator 62, which receives the discharge detection signal D. The first pulse generator 62 supplies a main gate signal MG, shown in FIG. 4(a), to the second pulse generator 63. In response to the main gate signal MG and the discharge detection signal D, shown in FIG. 4(b), the first pulse generator 62 further generates a first gate signal G1, shown in FIG. 4(c), having a pulse width of time duration TO, and which rises at the leading edge of the discharge detecting signal D and falls at the trailing edge of the main gate signal MG. The first gate signal G1 is supplied as a pulse control signal to the gate of the first switching transistor 22. When the first gate signal G1 is high, i.e., during the ON-time TO defined by the first setting data D1, the first switching transistor 22 is in an ON condition.

Figure 4:
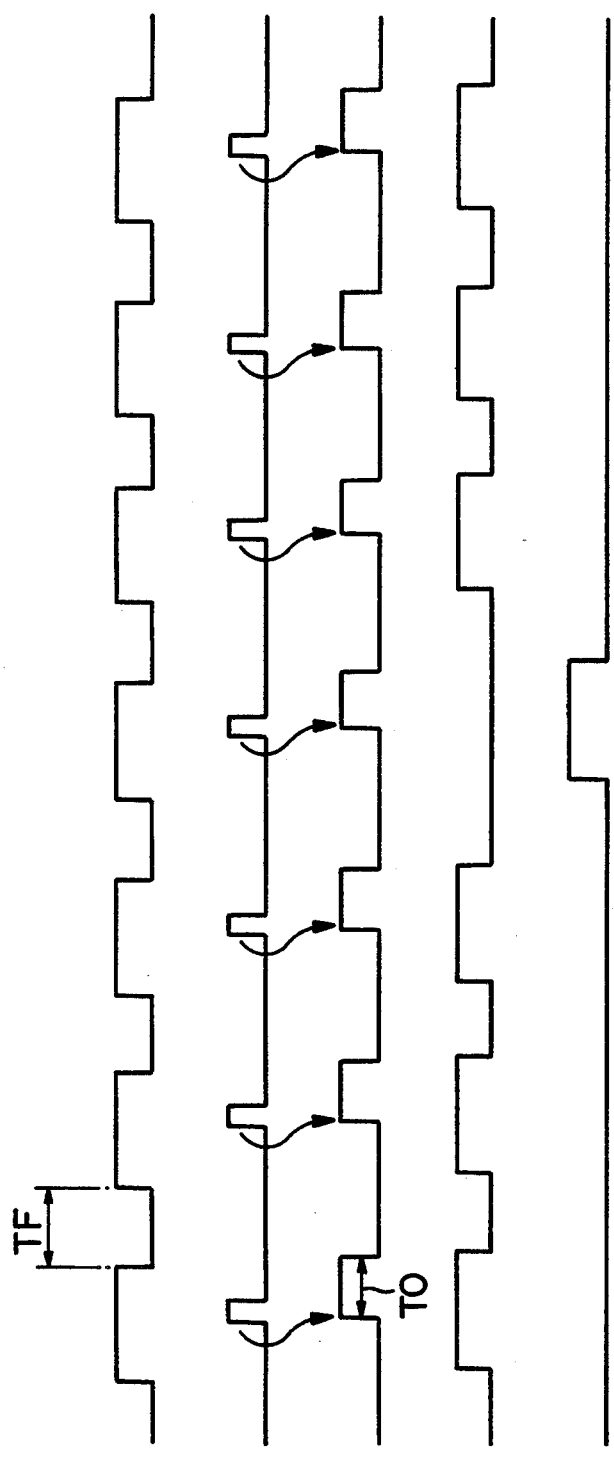
FIGS. 4(a), 4(b), 4(c), 4(d), and 4(e) are timing charts illustrating the operation of the control circuit shown in FIG. 3.

The second pulse generator 63 is formed as a pulse distributor, which selectively outputs either a second gate signal G2, which is a train of pulse(s) having ON/OFF times which generally correspond to the ON/OFF times of the main gate signal MG, or a third gate signal G3, in accordance with the third and fourth setting data D3 and D4, which is a pulse or pulses having ON/OFF times which generally corresponds to the ON/OFF times of the main gate signal MG. This pulse distributing operation will be described with reference to waveforms shown in FIGS. 4(a), 4(d) and 4(e). The third setting data D3 represents the number of second gate signals G2 in one cycle of distribution, i.e., with reference to FIGS. 4(d) and 4(e), from the leading edge of the first of a train of second gate signals G2 to the leading edge of the first of the third gate signals G3. The fourth setting data D4 represents the number of third gate signals G3 in one cycle of pulse distributions. According to the third and fourth setting data D3 and D4, the main gate signals MG are distributed as second gate signals G2 and third gate signals G3, as shown in FIGS. 4(d) and 4(e). In the illustrated embodiment, the number NE of the reverse-polarity auxiliary voltage pulses is, in accordance with the third setting data D3, set to the number "3" and the number PO of the regular-polarity auxiliary voltage pulses is, in accordance with the setting data D4, set to the number "1". In other words, the distribution ratio is 3:1.

Referring back to FIG. 1, the second gate signal G2 is supplied as a pulse control gating signal to the gate of the second switching transistor 34. When the second gate signal G2 is high, the second switching transistor 34 is in an ON condition. The third gate signal G3 is supplied to the gate of the third switching transistor 44 as a pulse control gating signal, the third switching transistor 44 being in an ON condition when the third gate signal G3 is high.

Referring to waveforms in FIGS. 4(a) to 4(e), as will now be appreciated by the artisan, either the second or third switching transistors 34 or 44 is turned on prior to turning on the first switching transistor 22. The first switching transistor 22 is turned on when the discharge detecting circuit 50 detects the occurrence of a discharge in the machining gap 4 and generates the discharge detecting signal D.

Figure 5:
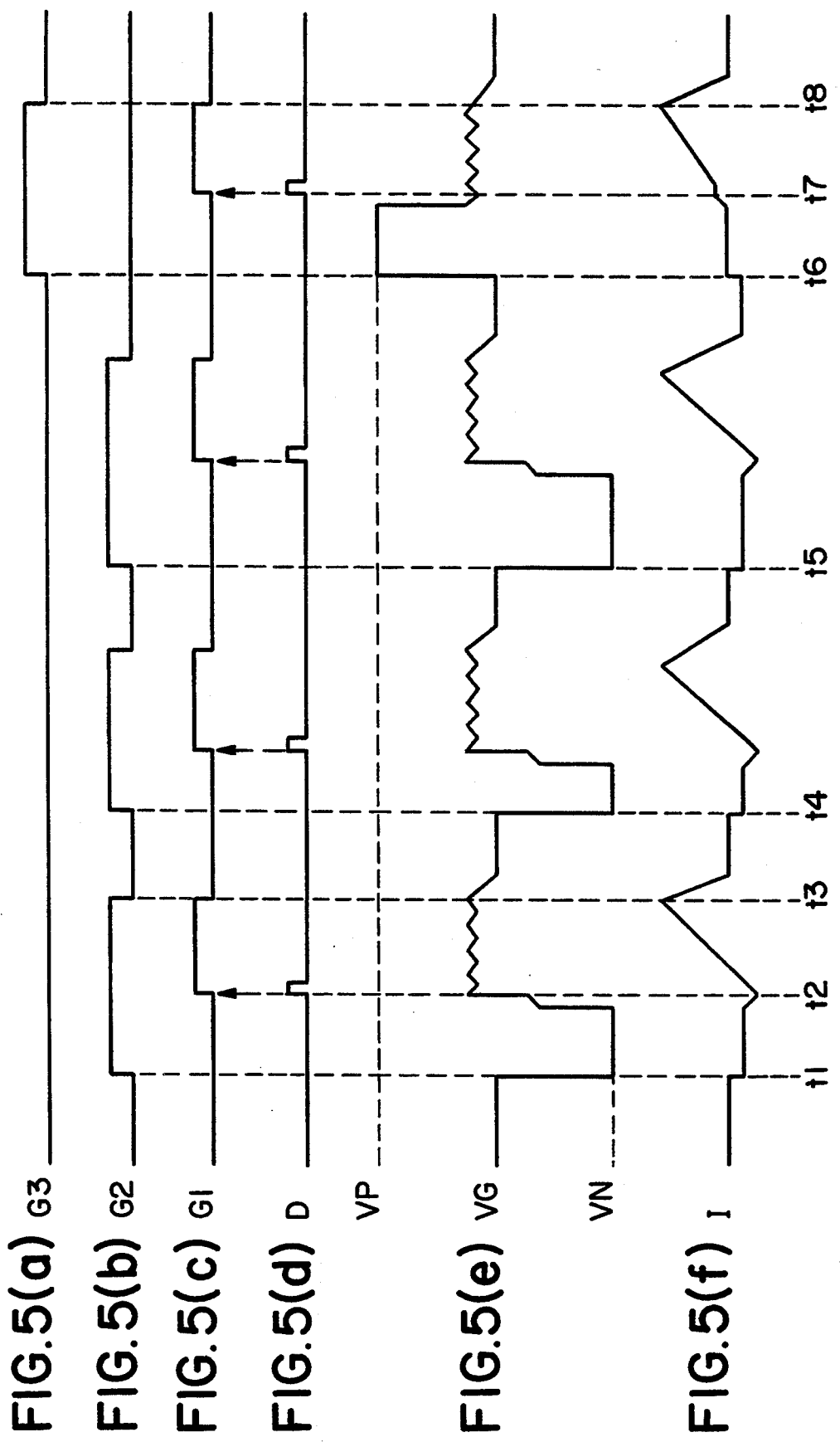
FIGS. 5(a), 5(b), 5(c), 5(d), 5(e) and 5(f) are timing charts illustrating the operation of the apparatus of FIG. 1.

Operation of the apparatus shown in FIG. 1 will now be described with reference to FIG. 5. FIGS. 5(a), 5(b), 5(c) and 5(d) are illustrative of waveforms of the third gate signal G3, the second gate signal G2, the first gate signal G1 and the discharge detecting signal D, respectively. FIG. 5(e) illustrates typical waveforms of a gap voltage VG, developed in the machining gap 4, and FIG. 5(f) illustrates a waveform of a discharge current I flowing across the machining gap 4.

At the time t1, prior to the occurrence of the first gate signal G1, when the second gate signal G2 goes high, the variable, low-voltage d.c. power source 31 applies the relatively low d.c. voltage, VN, to the machining gap 4 in so-called reverse polarity. Thereby, a discharge starts in the machining gap 4 and at the time t2, when the discharge detecting signal D goes high, the first gate signal G1 goes high and the high-voltage, d.c. power source 21 applies the higher d.c. voltage, VO, to the machining gap 4 in so-called regular polarity. Therefore, the workpiece 2 is machined by electric energy from the high-voltage, d.c. power source 21 until the time t3, when the main gate signal MG goes low. Although a discharge current I flows from the wire electrode 3 through the gap 4 to the workpiece 2 at the start of a discharge, after the time t2, the discharge current I flows in the opposite direction, its level reaching a peak at time t3, and rapidly decreases after time t3, when the first gate signal G1 goes low.

In other words, first the reverse-polarity auxiliary voltage pulse is applied to the machining gap 4 through the second circuit 30, and once a discharge starts, the main voltage pulse is applied to the gap 4 through the first circuit 10 in the regular polarity. In the illustrated embodiment, the above-stated voltage applying operation is repeated by three times.

After that, at time t6, the third gate signal G3 goes high prior to the first gate signal G1 and the variable, low-voltage, d.c. power source 41 in the third circuit 40 applies the variable, relatively low level, d.c. voltage, VP, across the machining gap 4 in the so-called regular polarity. Thereby, a discharge is caused to start in the machining gap 4. At time t7, when the discharge detecting signal D goes high, the first gate signal G1 goes high and the voltage VO from the high-voltage, d.c. power source 21 is applied across the gap 4, still in the regular polarity. Therefore, electric energy for discharge machining is supplied to the gap 4 from both d.c. power supplies 21 and 41 at the same, i.e., regular, polarity. At time t8, when the first and third switching transistors 22 and 44 are both turned off, the level of discharge current I rapidly decreases and the discharge ends.

As will now be appreciated by the artisan, before the main voltage pulse of regular polarity are applied across the machining gap by means of the first circuit 20, one of two situations has occurred: either an auxiliary voltage pulse of reverse polarity has already been applied across the machining gap 4 by means of the second circuit 30, whereby during a discharge waiting period preceding a discharge electrolytic activity is effectively inhibited, or a regular-polarity auxiliary voltage pulse has been applied across the gap 4 by means of the third circuit 40 during the discharge waiting time. The normal and reverse polarity auxiliary voltage pulses are applied at a predetermined ratio, whereby priority is preferably given to improving the machining rate over inhibiting electrolytic activity.

As will be appreciated by the artisan, according to the embodiment described, the numbers NE and PO, respectively corresponding to the number of the reverse-polarity and regular-polarity auxiliary voltage pulses preceding the main voltage pulse, can be set according to the resistivity to electrolytic erosion at a particular machining operation, which may depend, for example, on the material of the workpiece to be machined. In other words, the ratio between the reverse-polarity and normal-polarity auxiliary voltage pulses can be properly set to inhibit the electrolytic activity without unduly sacrificing the machining rate.

Figure 6:
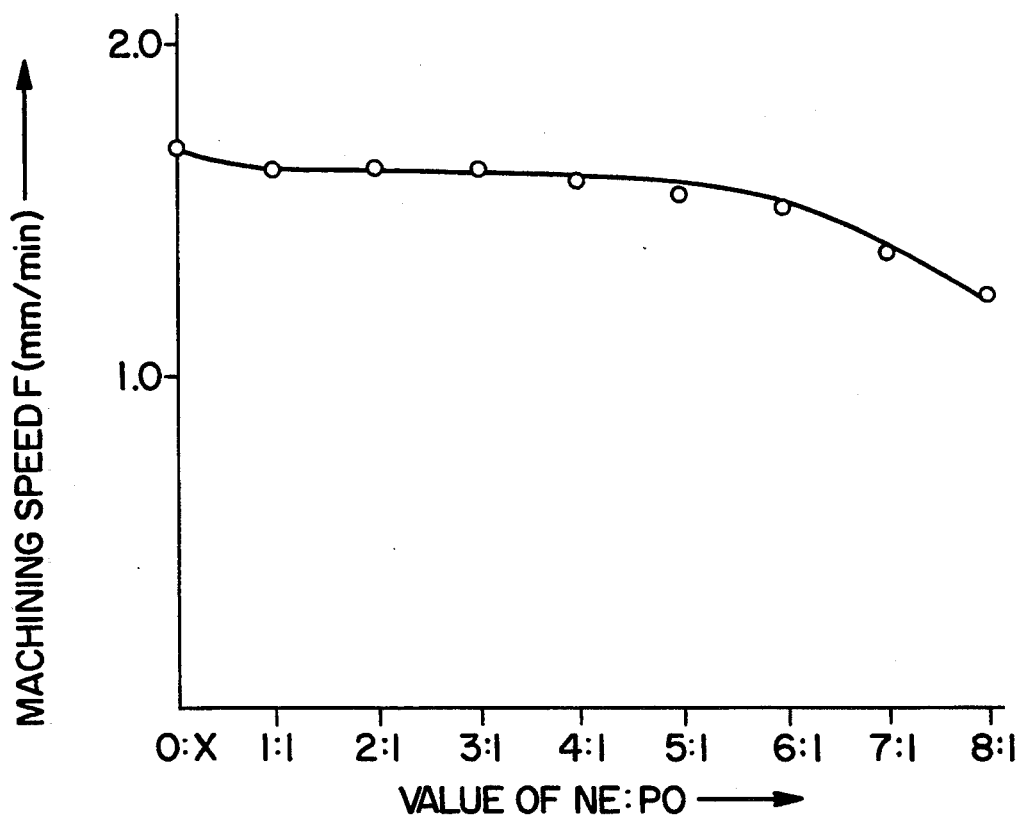
FIG. 6 is a graphical representation of data depicting machining rate as a function of the ratio between the auxiliary, reverse-polarity voltage pulses, and the main, regular-polarity voltage pulses, using the apparatus of FIG. 1.

FIG. 6 is a graph of actual machining rates F (mm/min.) plotted against values of the ratio NE:PO. In the experiment which gave rise to this data, electric discharge machining was performed on a workpiece made of tungsten carbide, using a brass wire electrode having a diameter of 0.2 mm while flushing the machining area with a water from a nozzle having an inner diameter of 6 mm at a pressure of 8 kg/cm2. As illustrated, the machining rate decreases as the ratio of the reverse-polarity auxiliary voltage pulse increases. The illustration further shows that even if the ratio of the reverse-polarity auxiliary voltage pulse is increased up an NE:PO ratio of 6:1, the machining rate falls off only very slightly, while the electrolytic activity is effectively prevented.

Also, according to experiments, when WC is employed as a workpiece, the electrolytic activity is effectively inhibited without reducing the machining rate by setting the value of the NE:PO ratio to about 6:1. Also, when JIS SKD-11, which is not susceptible to electrolytic erosion, is employed as a workpiece, a relatively high machining rate may be maintained while effectively inhibiting any electrolytic activity, even if the value of the ratio of NE:PO is set to between 1:1 through 6:1. When machining a workpiece made of JIS NAK-55, which is susceptible to electrolytic erosion, electrolytic activity may be inhibited without reducing machining rate, where the value of the ratio of NE:PO is as high as about 6:1.

The foregoing description of a preferred embodiment of the invention has been presented for purposes of illustration and description. It is not intended to be exhaustive or to limit the invention to the precise form disclosed, and obviously many modifications and variations are possible in the light of the above teaching. For example, instead of applying the auxiliary voltage pulses and the main voltage pulses of regular polarity across the machining gap successively, the main voltage pulses may be applied across the gap synchronistically with the main gate signal. In addition, the invention is applicable to a diesinking electric discharge machining apparatus, as well as a wire-cut electroerosion apparatus wherein similar benefits can be obtained. It is intended that the scope of the invention be defined by the claims appended hereto.

We claim:

1. A method of inhibiting electrolytic activity during electroerosion machining of a workpiece by means of an electrode spaced from said workpiece across a machining gap filled with a liquid dielectric comprising;
   applying a train of successive machining pulses of a first polarity across said machining gap; and
   selectively applying either a first auxiliary voltage pulse of a second polarity or a second auxiliary voltage pulse of said first polarity across said machining gap, prior to applying a machining pulse, the ratio of said first auxiliary voltage pulses to said second auxiliary voltage pulses being selected to effectively inhibit electrolytic effects while maintaining a high machining rate.

2. The method according to claim 1, wherein said machining pulses are derived from a main power source of a first voltage level and said first and second auxiliary machining pulses are derived from first and second auxiliary power sources of voltage levels lower than said first voltage level.

3. The method according to claim 2, wherein said first and second auxiliary power sources have variable voltage levels.

4. The method according to claim 1, further comprising the steps of:
   detecting the initiation of a discharge and generating a detection signal; and
   initiating said machining pulses upon generation of a detection signal.

5. The method according to claim 4, further comprising the steps of:
   generating a main gating pulse signal; and
   wherein the step of selectively applying either the first or second auxiliary voltage pulses comprising timing said pulses to generally correspond to said main gating pulse signal, whereby said first and second auxiliary voltage pulses have an initiation time which precedes the initiation of said machining pulses.

6. A method of inhibiting electrolytic activity during electroerosion machining of a workpiece by means of an electrode spaced from said workpiece across a machining gap filled with a liquid dielectric, comprising the steps of:
   detecting the initiation of a discharge across said machining gap and thereupon generating a detection signal;
   repeatedly applying machining pulses of a first polarity across said machining gap upon generation of said detection signal;
   applying, prior to initiation of a predetermined percentage of said machining pulses, an auxiliary voltage pulse of an opposite polarity to said machining pulses across said machining gap to thereby initiate a discharge across said machining gap said predetermined percentage being less than 100%.

7. The method according to claim 6, wherein said machining pulses are derived from a power source having a first voltage level and said auxiliary voltage pulses are derived from an auxiliary power source of a second voltage level lower than said first voltage level.

8. The method according to claim 7, wherein said second voltage level is variable.

9. A power supply for an electroerosion machine for machining a workpiece using a tool electrode, said tool electrode being spaced from said workpiece across a machining gap, said power supply comprising:
   a discharge detector for detecting initiation of a discharge across said machine gap and for thereupon generating a detection signal;
   a main power circuit, responsive to said detection signal, for repeatedly applying a main machining pulse of a first polarity across said cross said machining gap;
   an auxiliary power circuit for applying an auxiliary voltage pulse of a second polarity opposite to said first polarity across said machining gap prior to initiation of said main machining pulse;
   means for controlling said auxiliary voltage pulse whereby, for a pre-determined percentage of said main machining pulses, an auxiliary voltage pulse is applied across said machining gap prior to said main machining pulses, said pre-determined percentage being less than 100%.

10. A power supply for an electroerosion machine for machining a workpiece, using a tool electrode, said tool electrode being spaced from said workpiece across a machining gap, said power supply comprising:

a first power circuit for repeatedly applying a main machining pulse of a first polarity across said machining gap;

a second power circuit for applying first auxiliary voltage pulses of a second polarity, opposite to said first polarity across said machining gap;

a third power circuit for applying second auxiliary voltage pulses of said first polarity across said machining gap; and control means for selectively applying either said first or said second auxiliary voltage pulses across said gap at a time prior to initiation of said main machining pulse, said first and second auxiliary pulses being applied in a predetermined ratio whereby electrolyte effects in said machining gap are effectively inhibited while maintaining a high machining rate.

11. The power supply according to claim 10, further comprising means for detecting the occurrence of discharge, and thereupon generating a detection signal, and wherein said control is responsive to said detection signal for initiating said machining pulses.

12. The power supply according to claim 11, wherein said second and third power circuits include second and third gating switches, respectively, and wherein said control means is operable to selectively generate either a second gating pulse (G2) for generating a first auxiliary pulse, or a third gating pulse (G3) for generating a second auxiliary pulse, whereby said first and second auxiliary pulses are applied in accordance with said predetermined ratio.

13. The power supply according to claim 10, wherein said first power circuit includes a first power source of a first voltage level, and said second power source includes a second power circuit of a second voltage level lower than first voltage level, and said third power circuit includes a third power source having a third voltage level lower than said first voltage level.

14. The power source according to claim 13, wherein said second and third voltage level are variable voltage levels.

15. A method of inhibiting electrolytic activity during electroerosion machining of a workpiece by means of an electrode spaced from said workpiece across a machining gap filled with a liquid dielectric comprising:

generating a main gating pulse signal having an on time and an off time;

applying a train of successive machining pulses of a first polarity across said machining gap in response to said main gating pulse signal; and selectively applying either an auxiliary voltage pulse of a second polarity opposite to said first polarity or a modified machining pulse across said machining gap, saids auxiliary voltage pulse being applied across said machining gap, said modified machining pulse being applied across said machining gap during the on time of said main gating pulse signal, and prior to applying a machining pulse, said modified machining pulse being applied across said machining gap in the absence of said auxiliary voltage pulse and in synchronism with said main gating pulse on time, the ratio of said auxiliary voltage pulses to said modified machining pulses being selected to effectively inhibit electrolytic effects while maintaining a high machining rate.

16. The method according to claim 15, wherein said machining pulses are derived from a main power source of a first voltage level and said auxiliary voltage pulses are derived from an auxiliary power source of voltage level lower than said first voltage level.

17. The method according to claim 16, wherein said auxiliary power source has a variable voltage level.

18. The method according to claim 15, further comprising the steps of:

detecting the initiation of a discharge and generating a detection signal; and initiating said machining pulses upon generation of a detection signal.

19. A power supply for an electroerosion machine for machining a workpiece, using a tool electrode, said tool electrode being paced from said workpiece across a machining gap, said power supply comprising:

means for generating a gating pulse having an ON time and an OFF time;

a first power circuit for repeatedly applying a main machining pulse of a first polarity across said machining gap in response to said gating pulse;

a second power circuit for applying an auxiliary voltage pulse of a second polarity, opposite to aid first polarity across said machining gap;

control means for selectively applying either said auxiliary voltage pulse across said gap at a time prior to initiation of said main machining pulse, or a modified main machining pulse applied across gap during said gating pulse ON time in the absence of an auxiliary voltage pulse, said auxiliary voltage pulses and main machining pulses being applied in a predetermined ratio whereby electrolytic effects in said machining gap are effectively inhibited while maintaining a high machining rate.

20. The power supply according to claim 19, further comprising means for detecting the occurrence of discharge, and thereupon generating a detection signal, and wherein said control is responsive to said detection signal for initiating said main machining pulses.

21. The new power supply according to claim 20, wherein said first power circuit includes a first gating switch, and said second power circuit includes a second gating switch, and wherein said control means is operable to selectively generate either a second gating pulse (G2) for generating an auxiliary pulse, or a gating signal for generating a modified machining pulse, whereby said auxiliary and modified machining pulses are applied in accordance with said predetermined ratio.

22. The power supply according to claim 19, wherein said first power circuit includes a first power source of a first voltage level, and said second power source includes a second power source of a second voltage level lower than said voltage level.

23. The power source according to claim 22, wherein said second voltage level is a variable voltage level.

* * * * *